Jan. 6, 1970        B. R. GARRETT        3,487,908
APPARATUS FOR ARRANGING AND CONVEYING BOTTLES AND THE LIKE
Filed May 15, 1967        8 Sheets-Sheet 1

INVENTOR
BURTON R. GARRETT.
BY
Bierman & Bierman
ATTORNEYS.

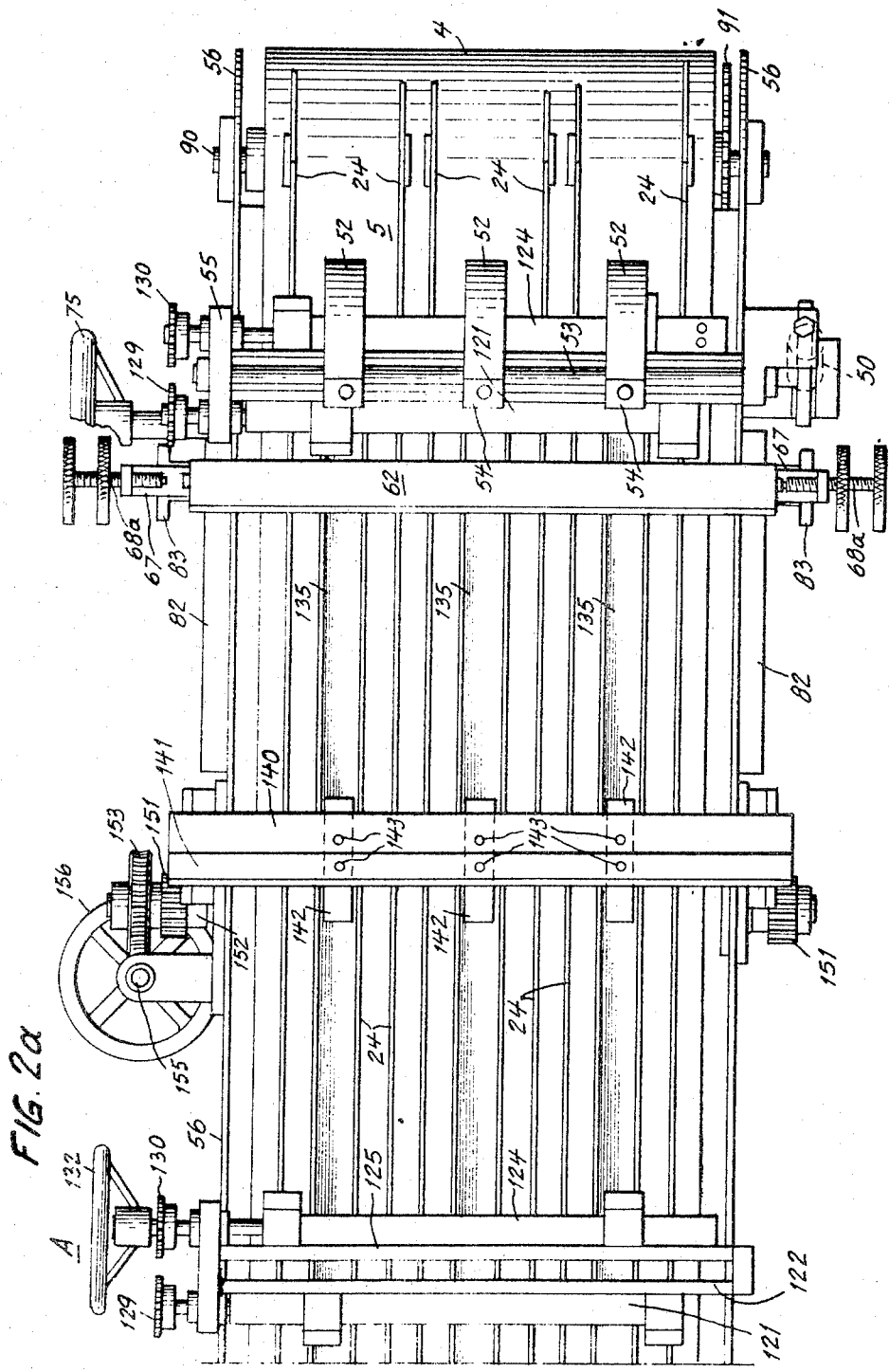

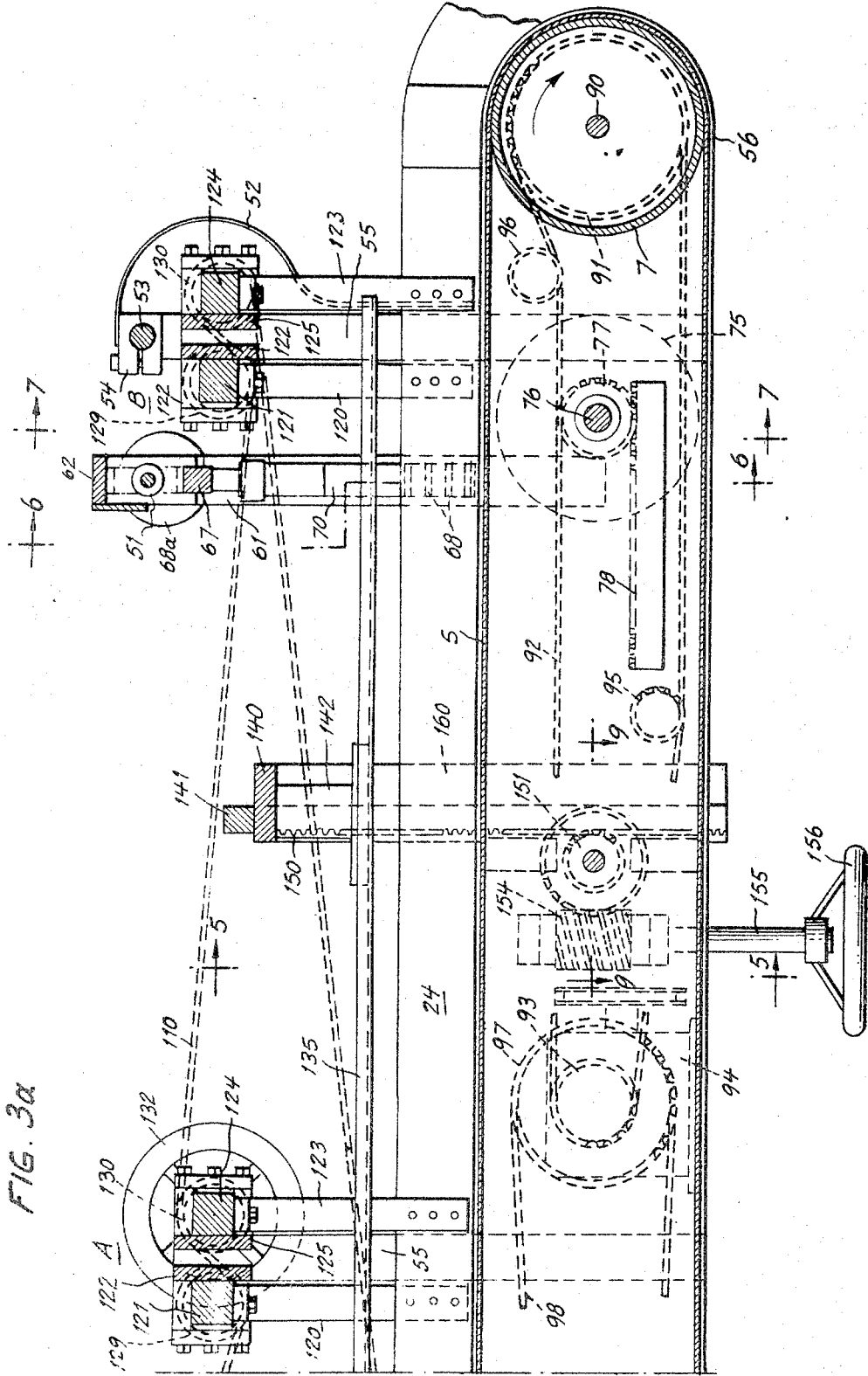

Jan. 6, 1970  B. R. GARRETT  3,487,908
APPARATUS FOR ARRANGING AND CONVEYING BOTTLES AND THE LIKE
Filed May 15, 1967
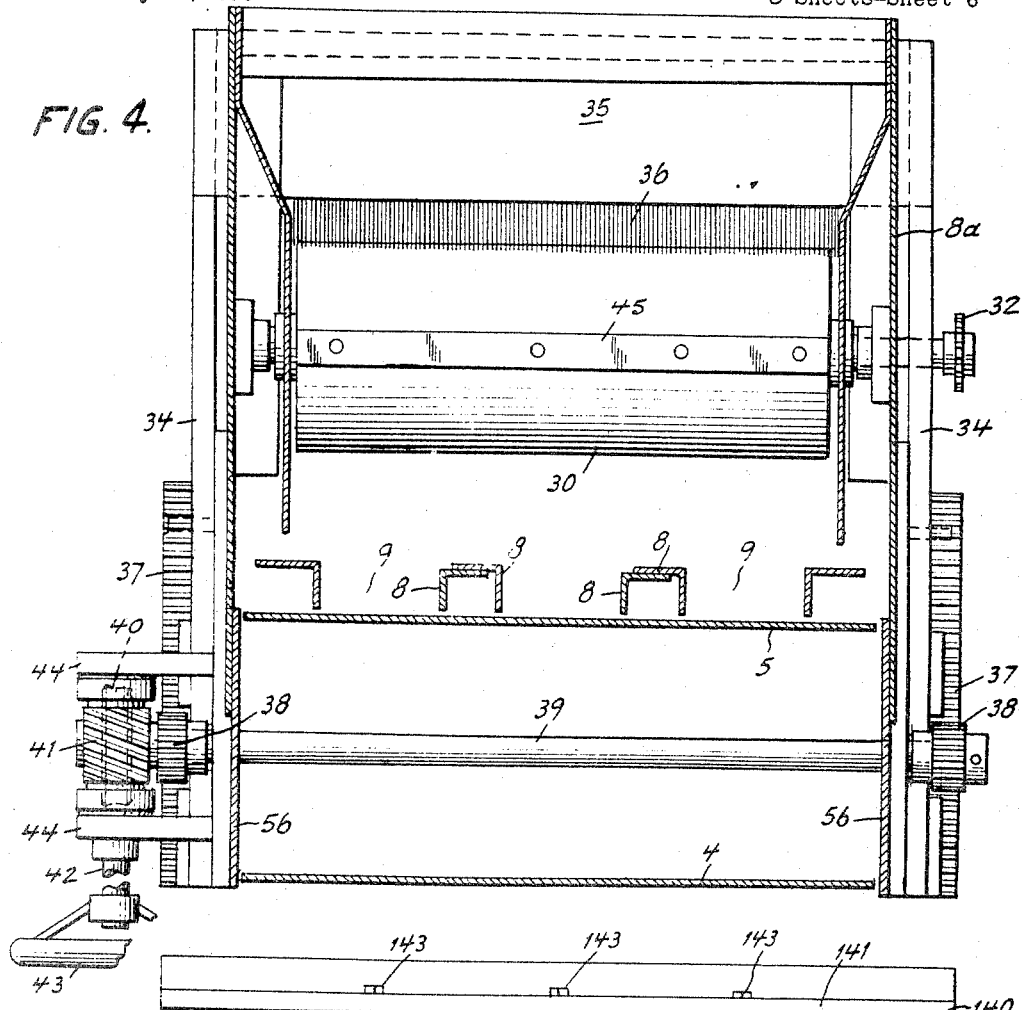
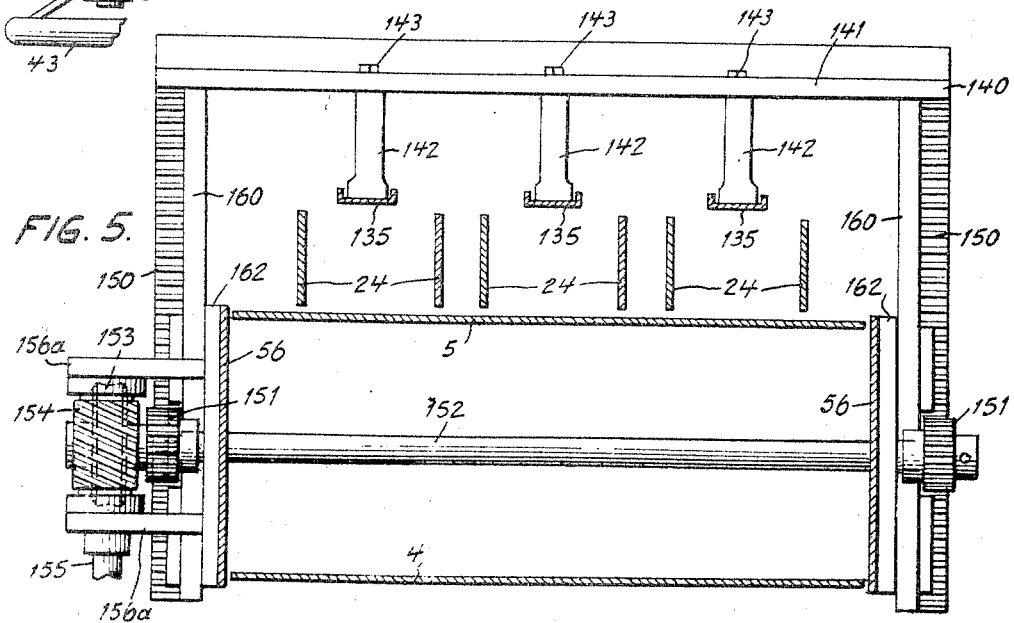

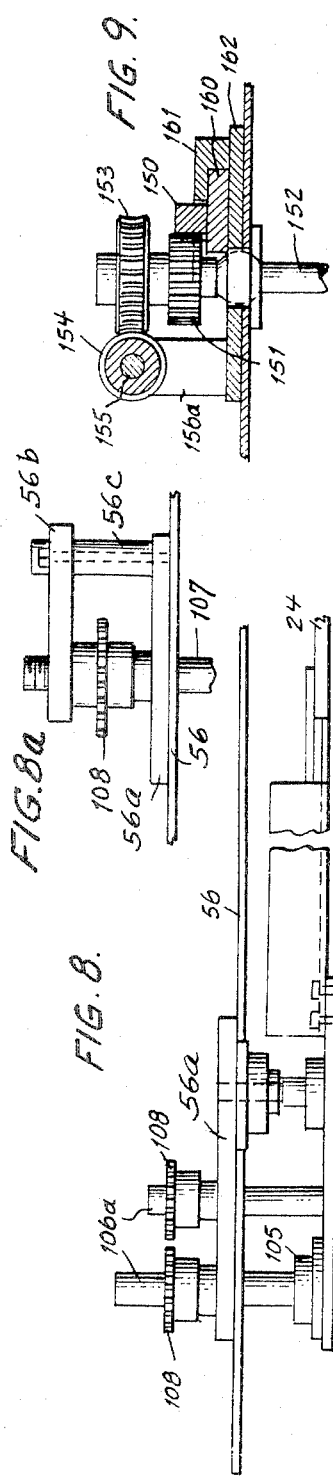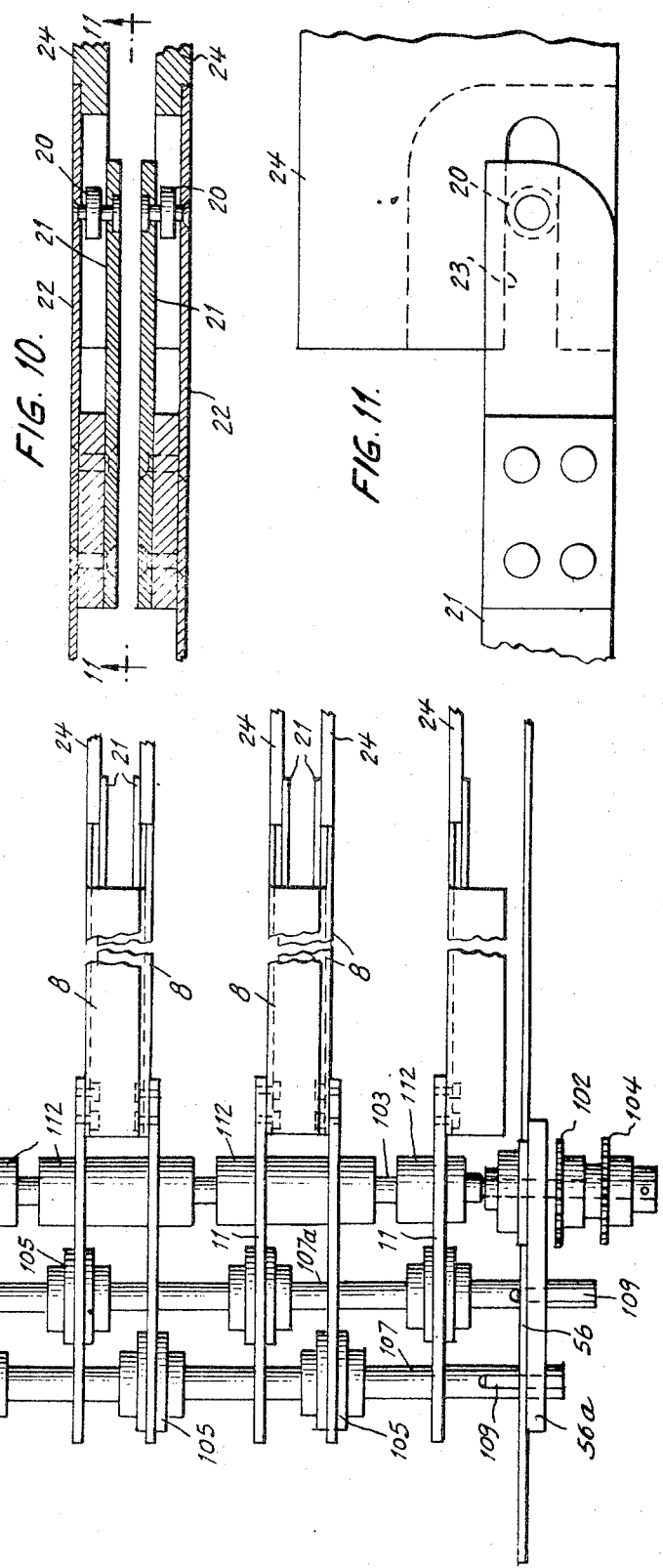

United States Patent Office 3,487,908
Patented Jan. 6, 1970

3,487,908
APPARATUS FOR ARRANGING AND CONVEYING BOTTLES AND THE LIKE
Burton R. Garrett, 131—12 232nd St., Laurelton, N.Y.
Filed May 15, 1967, Ser. No. 638,454
Int. Cl. B65g 47/26
U.S. Cl. 198—30           9 Claims

ABSTRACT OF THE DISCLOSURE

An apparatus for receiving and feeding articles such as plastic bottles etc. in which the bottles are contained haphazardly in a hopper and are conveyed therefrom on an endless belt conveyor that is operative below the hopper. There are adjustable guide channels above the conveyor and into which the bottles are received in an end-to-end arrangement and through which channels the bottles are moved by the action of the belt conveyor in their aligned end-to-end arrangement, toward the outlet end of the apparatus. Means is provided for providing a jostling or vibrating action to aid in directing the articles into the various channels so that as the articles move toward the outlet end of the apparatus, they will move in single file in each of the channels. Means is further provided for preventing more than a single layer of the articles to move in each channel, and adjacent to the outlet end of the apparatus is provided bottle-gripping and escapement means to permit one bottle at a time from each of the channels to be discharged.

---

This invention relates to an apparatus for arranging and delivering articles, such as plastic bottles or many other articles of various cross-sectional shaped and tapers, and particularly articles having greater length than width. The apparatus may be used to advantage for feeding successive articles in a number of rows to an orienting device which will receive the articles, and in the case of bottles or similar articles, orient them to an upstanding or mouth-upward position and deposit them upon a conveyor or some other surface. Such an orienting device is shown for example, in copending patent application for patent Ser. No. 469,203, filed July 22, 1965, now Patent No. 3,348,654. The above is a suggested use for the apparatus but it will be apparent from the following that it may be used for many other purposes, such as for example, a feeding and article-counting device for such articles as bottles, jars, cardboard or metal containers, cartons, plastic objects, bars of soap, etc.

In the accompanying drawings, wherein an illustrative embodiment of the invention is disclosed, FIG. 1 is a side elevational view of an apparatus constructed according to the invention and coupled to a bottle-orienting device;

FIGS. 2 and 2a, placed end-to-end constitute a top plan view of the apparatus;

FIGS. 3 and 3a, placed end-to-end constitute a longitudinal sectional view through the apparatus;

FIG. 4 is a sectional view, taken substantially on the line 4—4 of FIG. 3, looking in the direction of the arrows;

FIG. 5 is a sectional view, taken substantially on the line 5—5 of FIG. 3a, looking in the direction of the arrows;

FIG. 8 is a sectional view, taken substantially on the line 8—8 of FIG. 3, looking in the direction of the arrows;

FIG. 8a shows the mounting of the shafts which regulate the width of the article channels;

FIG. 9 is a sectional view, taken substantially on the line 9—9 of FIG. 3a, looking in the direction of the arrows;

FIG. 10 is a sectional view at one end of the vibrating bars; and

FIG. 11 is a sectional view, taken substantially on the line 11—11 of FIG. 10, looking in the direction of the arrows.

As herein mentioned, the present invention relates to means for handling plastic bottles, containers or similar articles, receiving the articles from a hopper and aligning them end-to-end in a plurality of channels or passages and releasing them into an orienting device and by means of which the bottles or containers are arranged with their mouths uppermost and are deposited in upright positions upon a conveyor. The orienting mechanism to which the bottles are presented by the apparatus of the present invention, may be one such as is disclosed in copending patent application Ser. No. 469,203, now Patent No. 3,348,654.

Figure 1:
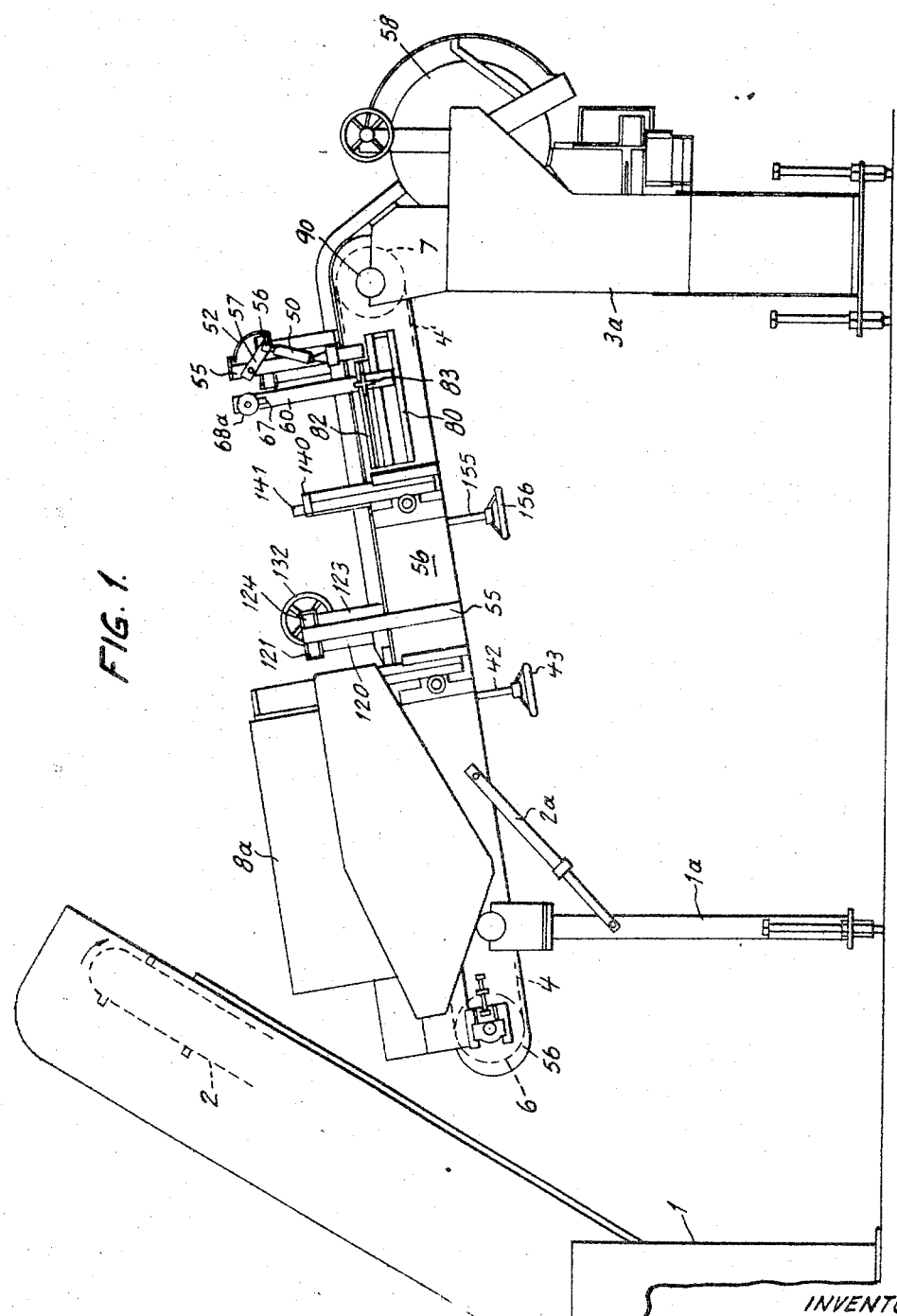

Referring to FIG. 1, there is shown therein a storage hopper 1 in which the bottles or similar articles are stored in random or haphazard disposition. Operative through the supply hopper 1 is an inclined cleated conveyor 2 which picks up the bottles and discharges them over the top as indicated by the arrow in FIG. 1. The bottles, when discharged from the conveyor 2, enter a second hopper 8a and descend therein upon a horizontal conveying means in the lower part of the hopper 8a. Such conveying means consists of a travelling endless belt 4 extending around the rollers or drums 6 and 7.

The apparatus may be supported in any suitable manner, such as by the legs 1a and 3a and the conveying means may be inclined slightly upwardly from the bottle-entering end to the discharge end by means of the braces 2a.

The driven drum 7 has a shaft 90 rotatably mounted in bearings in the side frames 56 of the apparatus, and said drum carries a sprocket 91, engaged by a chain 92, engaging sprocket 93, driven from a gear box that is coupled to an electric motor 94. Idlers 95 and 96 maintain the proper degree of tautness in the chain 92.

A sprocket shown at 97 is also driven by suitable gearing from the motor 94, and said sprocket drives a chain 98 engaging a sprocket 99 on shaft 100. A sprocket on shaft 100 drives a chain 101 which engages a sprocket 102 on shaft 103. A sprocket 104 engages chain 33 which extends over idler 106 and engages sprocket 32 on a "kick-out" drum 30 to be described.

Extending longitudinally of the apparatus and above the upper stretch 5 of the conveyor belt 4 is a plurality of guide bars 8 which define channels 9 between them as shown in FIG. 4 and through which the bottles or other articles travel. These bars, defining the sides of the channels, are adjustable to or from one another so that by moving them together or apart the width of each of the channels can be decreased or increased.

At their rear ends, the bars 8 are attached by the screws 10 (FIG. 3) to notched vibrator plates 11 (FIG. 8). The vibrator plates 11 are secured between hubs 105 that are mounted on a pair of parallel shafts 106 and 107 extending transversely of the conveyor 8a and mounted for a limited axial sliding movement or adjustment in the side members 56 of the apparatus. The shafts 106 and 107 are threaded at the ends 106a and sprockets 108 are threadably received on such ends.

The sprockets 108 are internally threaded to match the threads on the respective shafts 106 and 107. At their opposite ends these shafts have splines 109 which engage in keyways in the side members 56 so that while the shafts 106 and 107 can be adjusted axially, they are held against rotative movement.

Figure 2:
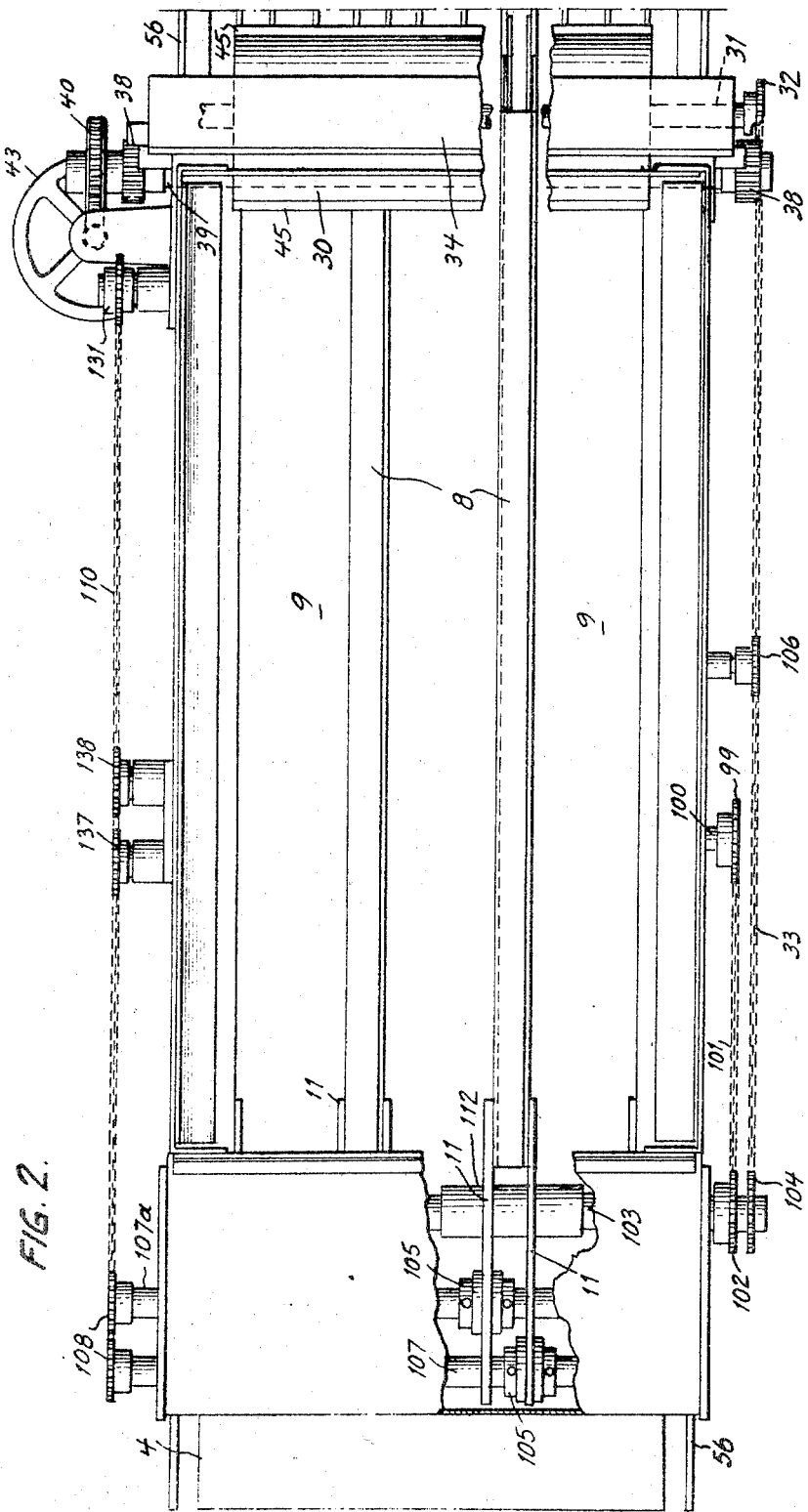

A chain 110 engages the sprockets 108 in the manner shown in FIG. 2 and it will be apparent therefrom that by the rotation of the sprockets 108 through movement of the chain 110, the shafts 107 and 106 will be moved in opposite directions and the bars 8 accordingly adjusted toward or away from one another and the article channels thus increased or decreased in width as required.

The vibrator plates 11 are notched to engage over cams or eccentrics 112 on the shaft 103. Each alternate eccentric on the shaft 103 is 180 degrees out of phase so that as the shaft revolves, alternate pairs of the bars 8 move in opposite directions in the vertical plane.

Rollers 20 (see FIGS. 10 and 11) are mounted between side plates 21 and 22 attached to bar 8. The rollers 20 oscillate in slots 23 in side guide plates 24. This provides for a linear action at this point and a rotary action at the eccentric end, causing a crank shaft type of motion. This arrangement is such that an oscillating movement is applied to the channel bars 8 by the action of the eccentrics and as the bars are vibrated they cause the bottles or other articles to find their way into the channels formed between the bars 8 and onto the conveyor belt 4 in an end-to-end formation.

Figure 3:
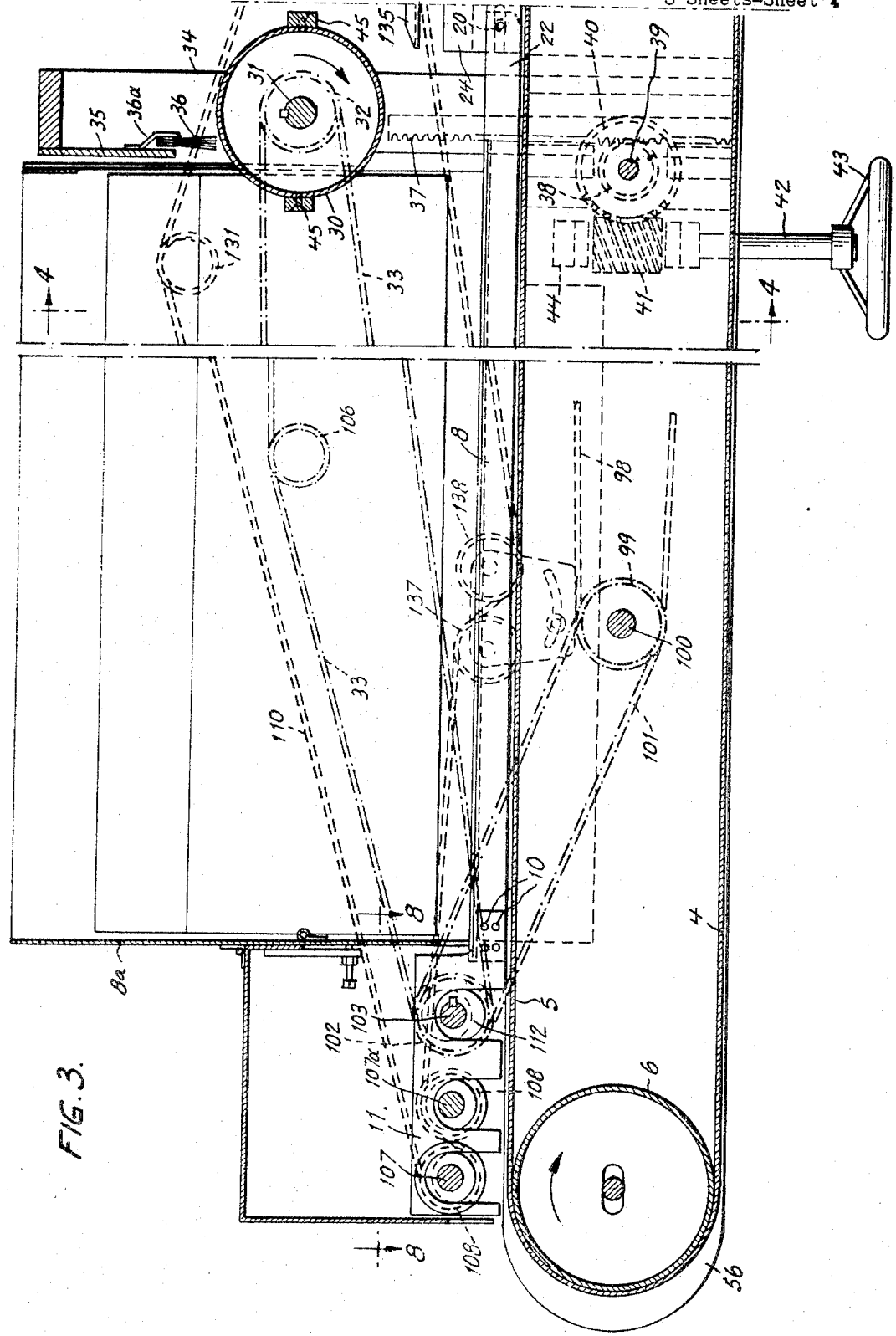

As the bottles or other articles are moved toward the right as viewed in FIGS. 3 and 3a and also in FIGS. 2 and 2a, they enter in single file between the side guide plates 24 which are adjustably spaced apart to allow the bottles to enter between them in a number of single file rows. These side guides form restricted article channels which constitute extensions of the channels between the bars 8.

The side guide plates 24 are arranged for adjustment to and from one another. One set of the guide plates 24 is carried by brackets 120 (FIG. 7) dependent from a transverse square bar 121 that is axially adjustable in a cross member 122 supported by uprights 55 extending from the side members 56. The second set of guide plates 24 is carried by similar brackets 123 from a second square bar 124 that is also slidable in a cross member 125 supported by uprights 55.

The square bar 121 is provided at one end with a threaded axial hole 126 engaged by the threaded shank 127 of a short shaft 128 carrying a sprocket 129. The square bar 124 is similarly constructed and is threadably engaged by a shaft carrying the sprocket 130. Chain 110, after passing over the idler 131, extends under the sprocket 127 and over the top of the sprocket 130. Since the sprockets 129 and 130 are rotated in opposite directions by the movements of the chain 110 it will be obvious that the side guide plates 24 in the two groups, carried respectively from the bars 121 and 124, will be moved toward or away from one another according to the movement imparted to the chain 110. Since the square bars 121 and 124 are non-rotative and the sprocket shafts are threadably engaged with said bars, the sprocket rotation as above described will cause the required axial sliding movement of the bars 121 and 124. Adjustable slack take-up sprockets 137 and 138 are provided for the chain 110.

Figure 7:
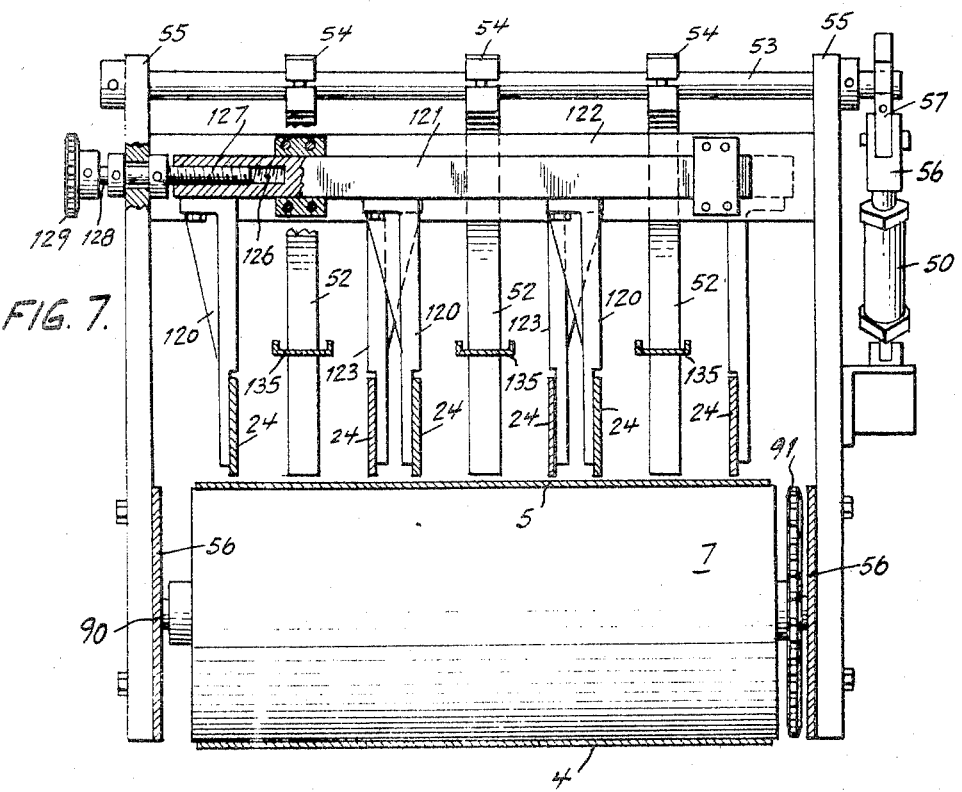
FIG. 7 is a sectional view, taken substantially on the line 7—7 of FIG. 3a, looking in the direction of the arrows.

The adjusting means described is that which is located at B adjacent to the outlet end of the apparatus, seen at the right in FIG. 3a and shown clearly in FIG. 7. This adjusting mechanism is repeated at the opposite end of the side guide plates 24 at the location indicated at A. The parts of this second adjusting means shown at A are indicated by reference characters similar to those used on the like parts of the structure shown at B.

In the structure shown at A, the shaft which carries the sprocket 130a also carries a hand wheel 132 and by the manual operation of this hand wheel the chain 110 will be moved to simultaneously effect the required adjustment of the side guide plates 24 toward or away from one another and provide the bottle channels of the required width. Since the chain 110 engages the sprockets 133 and 134, respectively, carried by the shafts 107 and 107a, it follows that the bars 8 will also be adjusted toward or away from one another as the chain 110 is moved by the rotation of the hand wheel 132.

The channels which are defined by the guide plates 24 also have top guides 135 which keep the bottles from rising out of the channels as the bottles travel in the channels. The mounting and adjustment of these top guide plates or bars is clearly shown in FIG. 5. A casting 140 is provided with a top cross piece 141 and brackets 142 carry the top guides 135 at their lower ends, the brackets being attached in suitably spaced relation by means of the screws 143.

The cross piece 141 has attached vertical side slides 160 (see FIG. 9). The slides 160 are confined behind fixed bars 161. Plate 162 completes the channel for the side bars 160. Attached to the side slides 160 are racks 150 which mesh with gears 151 carried by a shaft 152. Said shaft 152 extends transversely of the conveyor belt 4 and shaft 152 carries a worm gear 153 engaged by a worm 154 carried on a shaft 155 bearing a hand wheel 156. Shaft 155 is rotatable in the brackets shown at 156a. By rotation of the hand wheel 156, the casting 140 will be raised or lowered and the top guides 135, positioned over the bottle channels, will be readily located at the required height from the top stretch 5 of the conveyor belt 4.

As the bottles move from their random orientation in the hopper 8a to begin their entry into the channels defined by the guides 24 and 135, the bottles become restricted to end-to-end positioning by means of a knock-off roller 30. Said roller is mounted on a shaft 31 driven by means of sprockets 32 and chain 33. This roller assembly is carried in a vertically adjustable frame 34, provided at the top with a cross piece 35 carrying a brush 36 directed toward the periphery of the roller. A clamp 36a holds the brush in place. The brush tends to deflect any bottles back into the hopper when such bottles tend to climb toward the top of the roller.

The conveyor is generally inclined at an angle to horizontal so that the bottles or other articles tend to accumulate at that end of the hopper 8a that is the most remote from a separating or knock-off roller shown at 30 and must be carried toward it by the belt 4. This reduces the action of the wheel 30 against the articles to a minimum thereby reducing possible damage to the product.

The side members of the frame 34 carry racks 37 engaged by gears or pinions 38, mounted on a cross shaft 39. Said shaft 39 carries a worm gear 40 engaged by a worm 41 on said shaft 42 carrying a hand wheel 43. Shaft 42 and worm gear 41 carried thereon are rotative in the brackets 44.

Mounted on and extending radially from the periphery of the roller 30 is a number of strips or cleats 45 which can be composed of rubber or similar material and the same contact with and throw back into the hopper 8a any bottle tending to ride on top of the bottles travelling along in the channels. This prevents jamming at or blocking of the channels and particularly at the entrance end of the restricted channels that are defined by the side guides 24 and top guides 135.

A bottle escapement is located at the discharge end of the conveyor belt 4 and it releases one bottle at a time from each of the channels and in timed relation to an indexing mechanism such as is disclosed, for example, in the herein mentioned patent application Ser. No. 469,203, now Patent No. 3,348,654. The escapement consists of two air-actuated mechanisms, one of which includes an air cylinder 50 and is operative to release the first bottle in each channel and at the outlet or discharge end of the conveyor, while the second mechanism includes an air cylinder 51 (FIG. 6) that clamps the second bottle in each channel against the side guides 24 thereby holding back the rows of bottles and preventing the forward travel of the same.

The gate for the releasing mechanism includes a plurality of curved strips 52 secured at one end to a cross shaft 53 by means of clamps 54. One of each of the strips 52 is mounted near the outlet of each of the bottle channels and it is obvious that by the rocking movement of the shaft 53, the strips 52 will all be simultaneously raised to allow for the passage of the foremost bottle out of each of the channels. The shaft 53 is rotative in suitable bearings in the vertical posts 55 secured to the longitudinal side members 56 of the machine frame.

The piston of the air cylinder 50 has its clevis 56 connected to an arm 57 and at the proper times the shaft 53 is rocked to secure the required release of the bottles from the several channels. The bottles or other articles, when successively released as above described, enter into the orienting mechanism 58, an example of which is disclosed in the said patent application Ser. No. 469,203, now Patent No. 3,348,654, heretofore mentioned, and by which the bottles are all up-ended and delivered mouth-upward to a conveyor or other suitable support.

The air cylinder 50 is actuated by means of a valve (not shown) which can be employed to control the action of the cylinder 51 by means of which the retarder or "holdback" means is actuated. Uprights 60 and 61 are connected at the top by cross member 62 to which the air cylinder 51 is pivotally secured at 63. The thrust rod 64 of the cylinder is connected to yoke 65 which pivots in a bracket 66 mounted on a slidable cross bar 67. As the cylinder is actuated, the slide bar 67 is caused to be moved to the right, as viewed in FIG. 6, to first pinch the bottle in each track. Then when the slide bar 67 is moved to the left, the bottle will be released.

The pinching or gripping of the bottles is done by rubber fingers 68 which extend through elongated slots 69 provided in the left-hand side guides 24.

The rubber fingers 68 are secured on and project laterally from plates 70 which are mounted on parts 70a pivotally attached to parts 70b attached to slide bar 67. The joinder of the parts 70b to the parts 70a is done by rubber bands 70c and the mounting of the parts 70b on the slide bar may be such as to permit the fingers 68 to engage bottles of different widths. The rubber bands 70c hold the parts 70a in tension against parts 70b. The slide bar 67 overtravels so that each rubber band is distended, exerting a pressure of the fingers 68 against the bottles. This also provides for more or less uniform pressure against the sides of the bottles even though they vary in thickness or diameter. Adjustable stops 68a are provided at the opposite ends of the slide bar 67.

Figure 6:
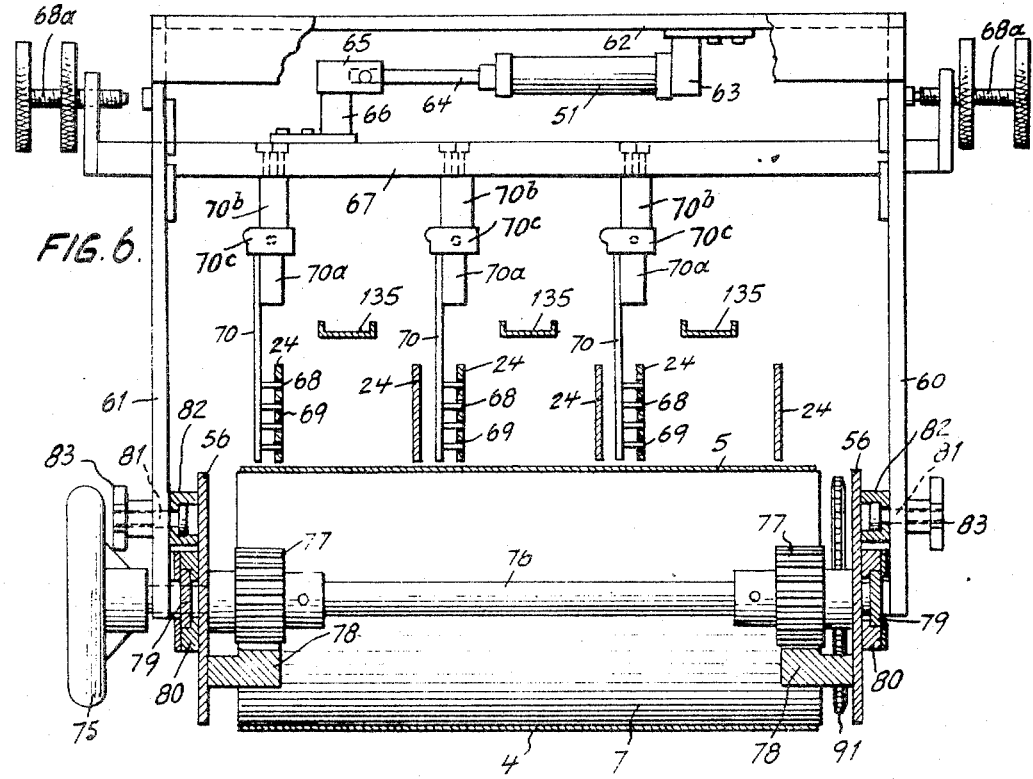
FIG. 6 is a sectional view, taken substantially on the line 6—6 of FIG. 3a, looking in the direction of the arrows.

When the slide bar 67 is moved to the right, as viewed in FIG. 6, the fingers 68 will be projected through the slots 69 to engage bottles between them and the opposite side guide plates 24, thereby halting the travel of the bottles while the foremost bottle in each channel is discharged.

In order to compensate for different container lengths, the retarding or separating mechanism just described can be adjusted toward or away from the release gates 52. This adjustment is accomplished by means of a hand wheel 75, mounted on a shaft 76, carrying gears 77 which mesh with racks 78 bolted to the side frames 56. As the hand wheel 75 is manually rotated, the gears 77 will roll along the racks 78 causing the shaft 76 to move to the left or right. The shaft 76 is rotative in bronze slide blocks 79 carried in ways 80 mounted on each of the side frames 76. The uprights 60 and 61 are bolted by the bolts 81 into slide bars 82 secured to the side frames 56, and said bolts will move back and forth in each of the slide bars 82 when the hand wheel 75 is turned. Hand knobs 83 are provided on the bolts 81 and when said knobs are tightened the side uprights 60 and 61 will be clamped against the side frames 56. This sets the pinching or gripping assembly in any position of adjustment and adds rigidity to the assembly.

From the foregoing, the operation of the apparatus will be readily understood. The bottles or other articles fed into the hopper 8a will be jostled or agitated therein by the vibratory movement of the bars 8 and the bottles will tend to fall into the channels defined by the bars 8 and will be carried along by the belt 4 toward and into the restricted channels defined by the side guides 24 and the top guides 135. Any bottles tending to climb on top of the bottom bottles will be thrown back by the action of the rotating separator 30 and the cooperating brush 36. As a result, all of the bottles entering the restricted channels defined by the top and side guides, will be disposed in single file and in single layers in each channel. When the bottles reach the discharge end of the conveyor 4 they will pass between the gripping or pinching fingers thereat and will be gripped and successively released and upon the opening swing of the gate, deposited into the orienting device or otherwise deposited on some suitable supporting means.

The adjustment of the several mechanisms which make up the apparatus permits the apparatus to handle a wide range of objects so that while the articles herein mentioned are stated to be bottles it is to be understood that other articles are comprehended within the term bottles. Also, while the escapement mechanism suggests the release of one of the articles at a time from each of the several channels, the escapement mechanism might also be adjusted to permit the release of several articles at a time.

What is claimed is:

1. In an apparatus for handling articles, a hopper, a conveyor belt operating below the hopper and receiving articles therefrom, vibrating means above the belt for imparting a jostling movement to the articles thereon, said vibrating means including bars defining channels between them, some of the channels being beyond the bars and confining the articles between them in single file, such articles being moved along in such arragement by the conveyor belt, gripping fingers co-operating with parts of the channels for grippingly engaging each article and holding it against movement when it reaches a point adjacent to a delivery end of the conveyor belt, and releasing means comprising a swinging gate for releasing the foremost article in a channel after it has been released by the gripping means.

2. An apparatus for handling bottles and similar articles comprising, a hopper for the articles, a conveyor in communication with the hopper and which receives the bottles therefrom, a plurality of parallel bars arranged above the conveyor and defining bottle channels between them, means for applying a vibratory motion to the bars, a plurality of side guides disposed beyond one end of the bars, said side guides being spaced apart to provide restricted channels forming continuations of those channels located between the bars, means for adjusting the side guides to or from one another to regulate the width of the channels between them, the guide means including top guides arranged above the channels defined by the side guides, means for adjusting the spacing of the top guides from the conveyor belt, a rotating ribbed roller located adjacent to the juncture of the bars and side guides to control the movement of the bottles into single layer as they enter between the side and top guides, means adjacent to one end of the conveyor for releasing successive bottles from the conveyor, and gripping means for engaging each bottle before it reaches a position of release by said releasing means.

3. An apparatus according to claim 2, wherein the conveyor is a travelling belt, the vibrating means for the bars being eccentrics, a brush arranged adjacent to the ribbed roller, the bottle-releasing means consisting of a pivoted gate and means for pivoting it, and the gripping means consisting of flexible fingers which engage the bottles between them and the side guides.

4. An apparatus for handling bottles and the like comprising, a hopper for receiving the bottles, the hopper being open at the bottom, a conveyor belt operative in the open bottom of the hopper for receiving and transporting the bottles, a plurality of bars arranged over the top of the conveyor belt and defining bottle channels between them, eccentric means located at one end of the bars for imparting vibration to the bars to facilitate the entry of the bottles in single layer into the channels, a rotary, cleated drum operative at the opposite end of the bars to deflect any bottles tending to climb on those in the channels, a plurality of guides disposed over the conveyor belt beyond the drum and defining channels between them, means for adjusting the guides to or from one another to regulate the size of said channels, a bar slidable transversely of the conveyor, pneumatic means for sliding said bar, fingers carried from said bar and effective on sliding movement of the bar to grip bottles between them and the guides, bottle-releasing means after the fingers and consisting of a pneumatically-operated, pivoted gate for releasing each bottle after it has been freed by the fingers.

5. An apparatus for handling bottles and the like comprising, a conveyor belt, vibrated bars disposed above the belt and defining bottle-channels between them, guides defining channels that form continuations of the channels that are located between the bars, gripping fingers movable to and from the guides for embracing the next to the first bottle in each channel while the bottle that is located forwardly of said gripped bottle is released, and releasing means comprising a pneumatically-operated gate that is operative to release the last-mentioned bottle.

6. In an apparatus for handling bottles and the like, conveying means for receiving the bottles, means defining bottle channels above the conveying means, said channel-forming means being bars extending longitudinally of the conveying means, means for adjusting said bars in a direction transversely of the conveying means, means for agitating the bars to facilitate the direction of the bottles into the channels, said agitating means consisting of eccentrics upon a shaft extending transversely of the conveyor, means for gripping each bottle in the channels as the bottle nears the end of its travel on the conveying means, guide elements located beyond the bars and defining restricted channels, top guides for co-operation with the guide elements in forming the latter channels, and the gripping means being elements movable to and from some of the guide elements to thereby grip bottles between them and said guide elements, and means for releasing each bottle after the grip on it has been released by the gripping means.

7. In an apparatus according to claim 6, including a separator positioned at a location between the ends of the vibrated bars and one end of the guide elements and effective to limit the entry of bottles between the guide elements to single file formation, means for adjusting the guide elements to or from one another, and means for adjusting the gripping means to or from the bottle-releasing means.

8. In an apparatus according to claim 7, wherein the separator is a rotating element located above the bars, a wiper located above the separator, means for adjusting the top guides to raise or lower the same, and the bottle-releasing means being a swinging gate operative to release a bottle after the grip of the gripping means on the same is released.

9. In an apparatus for transporting articles, a conveyor, a plurality of guide bars arranged above the conveyor to provide article-channels between them, means for vibrating some of the guide bars to facilitate the direction of the articles into the channels, means for adjusting the guide bars to or from one another to thereby regulate the width of the channels, said adjusting means including cross bars extending transversely of the conveyor, the guide bars being carried from the cross bars, means for axially shifting the cross bars, said means including sprockets, a chain extending between the sprockets, and means for manually rotating one of the sprockets to thereby cause all of them to be rotated to shift the cross bars to and from one another, said adjusting means being effective to simultaneously adjust the vibrated and non-vibrated guide means.

References Cited
UNITED STATES PATENTS

| 1,931,114 | 10/1933 | Olney | 198—30 |
| 1,079,165 | 11/1913 | Conte | 198—30 |
| 2,517,983 | 8/1950 | Crosland | 198—30 |
| 2,790,532 | 4/1957 | Albertoli | 198—30 |
| 3,179,230 | 4/1965 | Brown | 198—30 |

FOREIGN PATENTS 245,273  1/1926  Great Britain.

EDWARD A. SROKA, Primary Examiner

U.S. Cl. X.R.

221—183